United States Patent
Brown et al.

(10) Patent No.: US 7,127,495 B2
(45) Date of Patent: *Oct. 24, 2006

(54) CORRELATING INFORMATION BETWEEN INTERNET AND CALL CENTER ENVIRONMENTS

(75) Inventors: Sanford Samuel Brown, Bridgewater, NJ (US); Oleh George Danyluk, Bridgewater, NJ (US); Ronald V. Grippo, Red Bank, NJ (US)

(73) Assignee: AT&T Corp., New York, NY (US)

( * ) Notice: Subject to any disclaimer, the term of this patent is extended or adjusted under 35 U.S.C. 154(b) by 695 days.

This patent is subject to a terminal disclaimer.

(21) Appl. No.: 09/994,772

(22) Filed: Nov. 28, 2001

(65) Prior Publication Data

US 2002/0035647 A1 Mar. 21, 2002

Related U.S. Application Data

(63) Continuation of application No. 08/702,306, filed on Aug. 23, 1996.

(51) Int. Cl.
G06F 15/16 (2006.01)

(52) U.S. Cl. .................. 709/217; 709/219; 379/91; 379/93; 379/201; 379/219

(58) Field of Classification Search ............... 709/217, 709/219, 201, 227; 340/825; 375/219; 711/160, 711/171; 379/91, 93, 201, 219; 345/473, 345/738

See application file for complete search history.

(56) References Cited

U.S. PATENT DOCUMENTS 5,113,430 A * 5/1992 Richardson, Jr. et al. 379/88.17

5,247,347 A 9/1993 Litteral et al. ............. 358/85
5,337,044 A * 8/1994 Folger et al. ......... 340/825.44

(Continued)

FOREIGN PATENT DOCUMENTS

| CA | 2116801 | 3/1994 |
|----|---------|--------|
| CA | 2150150 | 5/1995 |
| EP | 0 633 685 | 1/1995 |
| EP | 0 740 445 | 10/1996 |

OTHER PUBLICATIONS

3_96Artikel ; http://www.inigraphics.net/publications/topics/1996/issue3/3_96Artikel.pdf.*

(Continued)

Primary Examiner—Thong Vu

(57) ABSTRACT

Coordination of information at the network-based level between call centers connectable over a telecommunications network, such as the telephone network, and a packet network, such as the Internet, creates improved integration of and bonding between a customer's interaction with a Web site and with a call center. Information about the customer and the customer's Web interaction are delivered to the call center agent along with the call, leading to increased productivity and efficiency in call handling as well as improved call routing. Calls may be routed to existing call centers based upon information from the Web experience, and information from the user's Web interaction is shared with the call center. Web interaction information is passed to existing call centers using known call center external control methods, such as DNIS signaling. Information about the Web experience may also be "whispered" to the call center agent, and an agent may "push" Web pages for review by the customer. As a result, customer acquisition and sales tools more powerful than a mere click-to-callback tool can be made available with a combined marketing approach using the Web and call centers.

14 Claims, 4 Drawing Sheets

U.S. PATENT DOCUMENTS

| | | | | | |
|---|---|---|---|---|---|
| 5,664,115 | A | * | 9/1997 | Fraser | 705/37 |
| 5,675,507 | A | * | 10/1997 | Bobo, II | 395/200.36 |
| 5,708,780 | A | * | 1/1998 | Levergood et al. | 709/218 |
| 5,710,887 | A | * | 1/1998 | Chelliah et al. | 395/50 |
| 5,715,444 | A | * | 2/1998 | Danish et al. | 1/1 |
| 5,737,592 | A | * | 4/1998 | Nguyen et al. | 707/10 |
| 5,764,910 | A | * | 6/1998 | Shachar | 395/200.53 |
| 5,784,058 | A | * | 7/1998 | LaStrange et al. | 345/738 |
| 5,812,776 | A | * | 9/1998 | Gifford | 709/218 |
| 5,835,724 | A | * | 11/1998 | Smith | 709/227 |
| 5,838,682 | A | * | 11/1998 | Dekelbaum et al. | 370/401 |
| 5,884,032 | A | * | 3/1999 | Bateman et al. | 709/204 |
| 5,901,287 | A | * | 5/1999 | Bull et al. | 709/218 |
| 6,249,291 | B1 | * | 6/2001 | Popp et al. | 345/473 |
| 6,385,646 | B1 | * | 5/2002 | Browen et al. | 709/217 |

OTHER PUBLICATIONS

JGR On The Web ; www.jgrweb.com/JGRb0.7/guide.html.*

Experiences in Developing Collaborative Applications Using the World Wide Web "Shell"; www.cs.unc.edu/~barman/HT96/P33/camera.html.*

Multi Call: Webcall—a real Virtual Call Centre?, Nov. 1995, Communications Ltd.

MacPherson G: *Why Call Centers Won't Escape the World Wide Web*, Business Communications Review, US, Hinsdale, IL, Jun. 1, 1996, pp. 39–41.

C. Low: *The Internet Telephony Red Herring*, HP Laboratories Technical Report, May 15, 1996, pp. 1–15.

S. Jacobs et al.: *Filling HTML Forms Simultaneously: CoWeb—Architecture and Functionality*, Computer Networks and ISDN Systems, NL, North Holland Publishing, Amsterdam, vol. 28, No. 11, May 1, 1996, pp. 1385–1395.

B. Walker: *Paving the Way for a Paperless Empire*, Network Week, GB, APT Data Services, London, vol. 1, No. 42, Jul. 10, 1996, pp. 29–30.

Kaufman H.: *Call Centers in Cyberspace*, Communications News, vol. 34, No. 7, Jul. 1, 1997, pp. 20–21.

Aspect Telecommunications—Agility™, *Aspect Call Center® and Aspect EnterpriseAccess*, 2 pp. copyright 1996, 2 pp. copyright 1995.

Edify Corporation, Santa Clara, CA: *What Is Page Call™?* 1 p.; *CyberSpace Meets Computer Telephony—The Voice Enabled Web*, 6 pp.

Edify Corporation, Santa Clara, CA: *Edify Solutions*, Banking Demo, 1 p.; *Edify Products—About the Electronic Workforce*, copyright 1995, 1 p.; *Edify—The electronic Workforce*, What's inside the Electronic Workforce? 2 pp.; Software for Interactive Services, 2 pp.; Customer Service, 3 pp.; Specifications for the Electronic Workforce, 2 pp.; copyright 1995–1996.

Genesys Telecommunications Laboratories, Inc., Atlanta, Dec. 5, 1995 Press Release, 1 page; *Genesys Canada Press Release*, Feb. 9, 1996, 1 page; *Advanced Intelligent Internet*, 1 page; *Corporate Overview*, 3 pp.; *Product Suite*, 1 page; *T–Server*, 2 pages, *Call Router*, 3 pages; *Call Center Manager*, 3 pages; *Concentrator*, 1 page; *SoftPhone*, 2 pages.

Rockwell International Corp., Downers Grove, IL, 1995: *Blending Personal Response with the Internet*, by Tony Dezonno and Joe Anderson, 4 pp.

Scopus Technology, Inc.: *Webteam*, 1996, 13 pages.

*Scopus Products*, 7 pp., 1996 copyright, *Scopus Products Overview*, 3 pp., 1996 copyright.

Spanlink Communications, Minneapolis, MN: *Extra–Agent™, WebCall™*, 4 pages.

AT&T: *WebCall™ Schematic*, 1996, 1 page; News Release, Dec. 4, 1995: *AT&T, Spanlink to provide secure Internet links*, 2 pp.

Spanlink Communications, Minneapolis, MN: *Spanlink Introduces WebCall™ Service Bureau*, 2 pp.; *WebCall product Info.*, 1995, 2 pp.

Venturian Software, Hopkins, MN: *Leading the Way in Internet Telephony*, 3 pp.

Call Center Magazine: *Connecting Your Call Center to the Web*, May 1996, 3 pp.

Individual, Inc., Burlington, MA: *Edify and InterLynx Team to Deliver Self–Service Human Resources Solution to Office Depot; Solution to Provide 22,300 employees Self–Service Benefits Enrollment*, Apr. 7, 1995, 2 pp.

Individual, Inc., Burlington, MA: *Promus Hotel Corp. Streamlines Call Center with Computer Telephony Integration from Edify; 300 Reservation Agents to Receive CTI Screen Pop From Edify Software*, Jul. 5, 1995, 2 pp.

Individual, Inc., Burlington, MA: *Aspect Telecommunications Announces Plans to Offer World Wide Web Solutions for Call Centers; New Web Interaction Capabilities for Agility will Transform Call Centers Into Even More Powerful Customer Information Transaction Centers*, Sep. 20, 1995, 2 pp.

Individual, Inc., Burlington, MA: *Call Centers Go On–Line*, Jan. 4, 1996, 2 pp.

Individual, Inc., Burlington, MA: *Computer, Technology Tie–Ten Knot*, Mar. 29, 1996, 3 pp.

Individual, Inc., Burlington, MA: *ECS Competitive News*, Aug. 18, 1995 Phillips Publishing, Inc., 3 pp.

* cited by examiner

CORRELATING INFORMATION BETWEEN INTERNET AND CALL CENTER ENVIRONMENTS

CROSS-REFERENCE TO RELATED PATENT APPLICATIONS

This patent application is a continuation of U.S. application Ser. No. 08/702,306, filed Aug. 23, 1996 entitled CORRELATING INFORMATION BETWEEN INTERNET AND CALL CENTER ENVIRONMENTS which is incorporated herein by reference.

TECHNICAL FIELD

This invention relates to the Internet and to call-center environments in general and, more particularly, to a way of correlating information between a packet network, such as the Internet, and call-centers connectable over a telecommunications network, such as the telephone network.

BACKGROUND OF THE INVENTION

The Internet is a dynamic packet network consisting of millions of interconnected computers which could run several applications, such as the World Wide Web. The Internet is implemented using a large variety of connections between those millions of computers. Internet access is readily available to individuals across the globe. Various on-line service providers, such as America Online, CompuServe, Prodigy, Netcom, etc., provide client connections over the public-switched telephone network (PSTN) using modems or integrated services digital network (ISDN) adapters. These on-line service providers maintain servers on the Internet providing client access to the Internet.

The Internet's global and exponential growth is common knowledge today. The recent developments on the World Wide Web user interfaces and information navigation software such as the Netscape Web browser, coupled with a continuously growing number of public access providers, are making the Internet a fundamental component of the information age, if not the information super highway itself.

A World Wide Web site on the Internet typically resides on a computer known as a server, which is accessed through the Internet by a user utilizing a client computer. A Web site consists of one or more Web pages comprising scripts written in Hyper Text Markup Language (HTML) and typically resides on a server compatible with HyperText Transport Protocol (HTTP, a protocol for interfacing with the Internet). Pages at a Web site are typically accessible and viewed by the user through software called a Web browser, which typically resides on the user's client computer. A Web browser such as the one by Netscape interprets Web page HTML scripts to provide a graphical user interface that allows easy access to various services over the Internet.

The client computer is capable of providing output for display of a Web page to a user, for example through a video display. Such output may take the form of at least one of textual, graphic, animation, video, audio, or virtual object media. The client computer is also capable of accepting input from a user. Such input may be provided by means such as a keyboard, a mouse, a telephone touch pad, a television remote control, and so on.

Users may browse the World Wide Web for virtually any kind of information, including information having content derived from one or more media, such as words, sounds or images. Increasingly, businesses are establishing Web sites as a means of providing information to and attracting potential customers, and Web sites are emerging as a means of transacting business. Users may locate a company's Web site by, e.g., using one of a number of existing search engines available over the Internet, or browsing other Web sites containing links to the company's Web site, or entering directly the Uniform Resource Locator (URL), which represents an "address" for the site. Typically, Web browsing takes place in the context of an interactive communication session, where the user may, for example, direct the Web browsing session by choosing to follow hypertext links found in Web sites and/or may respond to information located at various Web sites.

A vast number of businesses and other organizations, such as educational and charitable institutions, employ call centers to handle a variety of telecommunications tasks. Businesses commonly set up or employ call centers that their customers, who may be other businesses or individual consumers, may reach by dialing a toll-free "800" number. Call centers are an important means of providing information to and attracting potential customers, as well as transacting business. For example, call centers may be used for taking orders for products or services, providing customer assistance or technical support, and other sales, marketing and support activities. Call centers have found wide use in, e.g., the travel industry for handling reservations and the banking and financial service industry for account servicing.

A call center utilizes a telecommunications system that may be as simple as a single telephone manned by a single individual, or it may range from a group of agents manning a bank of telephones to an entire department or company having banks of telephones networked through private branch exchange (PBX) equipment dedicated to handling hundreds or thousands of calls. A call center may be located in a single facility with one PBX or in multiple facilities with multiple PBXs.

Call centers often employ interactive voice response (IVR) technology to, e.g., assist users in locating an available call center agent who is able to handle the user's request. A IVR system is, typically, a menu-driven system that prompts a caller to press "1" for a first option, to press "2" for a second option, and so forth, or alternatively prompts the user to enter a telephone extension, a password, an account number, or the like.

Call centers also employ Dialed Number Identification Service (DNIS) signaling techniques. DNIS signaling is a well known and understood convention which, in the call center context, typically involves passing a code to a call center along with a call representative of the telephone or communications number called; the DNIS code may be used by the call center to further route the call where appropriate.

Call centers enable business to be transacted interactively, in real time. However, call centers typically require significant staffing to handle an expected volume of calls due to inefficiencies created by the need for agents to obtain information about the customer and the subject of the customer's inquiry.

Web sites provide another means of conducting business, albeit not in real time; Web sites also do not have the level of interaction possible with a live customer-to-agent telephone call. However, Web sites offer the ability to capture the subject of the customer's inquiry and to provide the customer with preliminary information. Web sites also enable a sales or marketing client to "prequalify" a customer—such as determining the type of consumer and the type and level of goods or services sought by the consumer—before further contact with the consumer takes place. That is, a Web site can be used as a means to characterize the consumer and the consumer's interest, a task not easily accomplished by current IVR systems.

As important as these mechanisms for reaching customers and transacting business are, however, today there is little relationship between the activities of people calling into call centers using "800" or other telephone numbers and the activities of people interacting with Internet-based applications using Web browsers or other Internet-related applications. Typically, a consumer browsing a Web page has no interaction with call center environments. Information collected in the Web environment is not correlated with a call coming into a call center environment, and there is no pulling of Web interaction data into the call flow.

Any relationship between call center and Internet browsing activities is, for the most part, manually coordinated. For example, a consumer using an Internet browser logged into the Internet may be viewing an HTML page from a company's Web site. While browsing the Web page, the consumer may find information regarding a product or service he or she wishes to purchase, but the Web page may not have sufficient information to satisfy the consumer's interest in the product or service. The consumer wishes to call the company for more information regarding the product they have on their page. To obtain further information about the desired product or service, the consumer may call the company's appropriate "800," or other phone number, which may be listed on the Web page, and reach a call center managed by the company. However, in the typical scenario there is no information associated with the call entering the call center regarding the consumer's interactions with the Web site and what, if any, information the consumer has viewed. The consumer must verbally inform the agent of her discoveries on the Web site or what information she might be viewing, or use other traditional call center techniques, such as automatic number identification (ANI), IVR prompts, etc., provided by call center environments to let the call center agent understand the reason for the incoming call.

There are emerging in the marketplace applications having some limited capability of coordinating a consumer's interaction with a company's Web site to a call center environment. Such applications, like the one by Scopus Technology, provide the ability for a consumer who browses a company's Web site to initiate a call-back from a call center agent for the company by, e.g., clicking on a Web site icon or button. Other such premise-based applications include PageCall™ by Edify Corporation, WebCall by Spanlink Communications, and net.Vectoring by Genesys Labs.

According to information available at Spanlink's Web site (located at URL http://www.spanlink.com), "WebCall" prompts the customer for information and advises the customer when a return call is to be expected; the request for a call to the customer is transferred to a call center queue, from where an outbound call is eventually initiated. The call center agent who receives the call request also has access to customer information as well as information about what pages the customer has viewed at the Web site, through either a screen pop, text-to-speech synthesis or by whispering a URL reference number that the agent can enter; such information is, apparently, either stored at the call center or made available through interaction with the server hosting the Web site. Spanlink has also announced a service called WebCall/RS which, apparently, will incorporate its WebCall application at a remote site operated by Spanlink for use with existing call centers.

According to information available over Genesys' Web site (located at http://www.genesyslab.com), Genesys' net.Vectoring application ties together Genesys' telephony software, two-way real-time video conferencing and the Internet. When an Internet user clicks a button to connect to an agent, a call is connected from the agent to the user and the agent can view the Web page that a user is viewing (as well as account data and information about the user's prior interaction with the Web page). The application can also pass data for signaling to the telephone network, permitting the network to set up the call.

According to information available at Edify's Web site (located at URL http://www.edify.com), PageCall™ enables a call center agent to retrieve customer information and to track what Web pages at the Web site a customer has selected.

Although the above-described applications represent an improvement over the non-integration or manual integration of Web and call center experiences, certain disadvantages remain. With the possible exception of the WebCall/RS application by Spanlink, these applications are premise-based, meaning they are tied into a specific call center environment; a Web site must interact with the call center in an application-specific manner, and the call center must incorporate the technology for receiving any customer identification or other information from the Internet. These applications also generally do not have the ability to route a call externally to any call center.

The above-identified shortcomings result in increased expense for development of integrated solutions. Web site developers need to be concerned about the particular on-premise requirements for each system. Call center environments must incorporate the capability of making call routing decisions based upon any information it receives about the customer's Web interaction.

Further, these applications do not provide bonding of Internet browsing sessions and call center sessions at the time the call request is delivered to the call center. Session bonding in this context is the process of maintaining a continued association between the customer's Web session and the call between customer and call center. Session bonding would permit, e.g., the call center agent to pass information (such as visual information in a Web page) over the Internet to the user while, at the same time, speaking with the user over a telephone connection. To the extent the above-referenced applications provide any session bonding (e.g., the Edify PageCall™ application), such bonding is accomplished only from the call center to the customer, and only with an application-specific interface at the call center—requiring a tight coupling between call center and customer. This has a disadvantage of requiring the call center to include mechanism for controlling the interaction between telephone and Web communications. Such control mechanism is not required within the call center environment if the bonding takes place external of the call center environment.

Coordination of the Internet browsing and call center activities can enhance the capability of using existing call centers and the Internet to provide the desired marketing, sales and customer handling services. For example, judgments about initiating or routing calls could be based upon Web interaction data.

What is desired is a way to enable coordination of information at the network-based level between existing call centers and a packet network, such as the Internet, to create improved integration of and bonding between call center and Web-based communication sessions in order to increase productivity and efficiency and to enable better call routing while delivering to the call center agent information about the call and the customer along with the call. Such coordination and delivery of information related to the person's interactions with the Internet along with the routing of calls would enable existing call centers to obtain the advantages of coordinated Web interaction while using standard call center hardware and software without additional customized hardware or software.

SUMMARY OF THE INVENTION

The present invention enables coordination of information at the network-based level between call centers connectable over a telecommunications network, such as the telephone network, and a packet network, such as the Internet, to create improved integration of and bonding between a customer's interaction with a Web site and with a call center. The invention provides delivery of information about the customer and the customer's Web interaction to the call center agent along with the call, leading to increased productivity and efficiency in call handling as well as improved call routing.

The present invention enables call routing to existing call centers based upon information from the Web experience, and sharing of information from the user's Web interaction with the call center. The invention works with existing call center technology using known call center external control methods, such as DNIS signaling, to pass Web interaction information to the call center. The present invention also enables information about the Web experience to be "whispered" to the call center agent, and it enables an agent to "push" Web pages for review by the customer. As a result, customer acquisition and sales tools more powerful than a mere click-to-callback tool can be made available with a combined marketing approach using the Web and call centers.

DETAILED DESCRIPTION

Overview

Figure 1A:
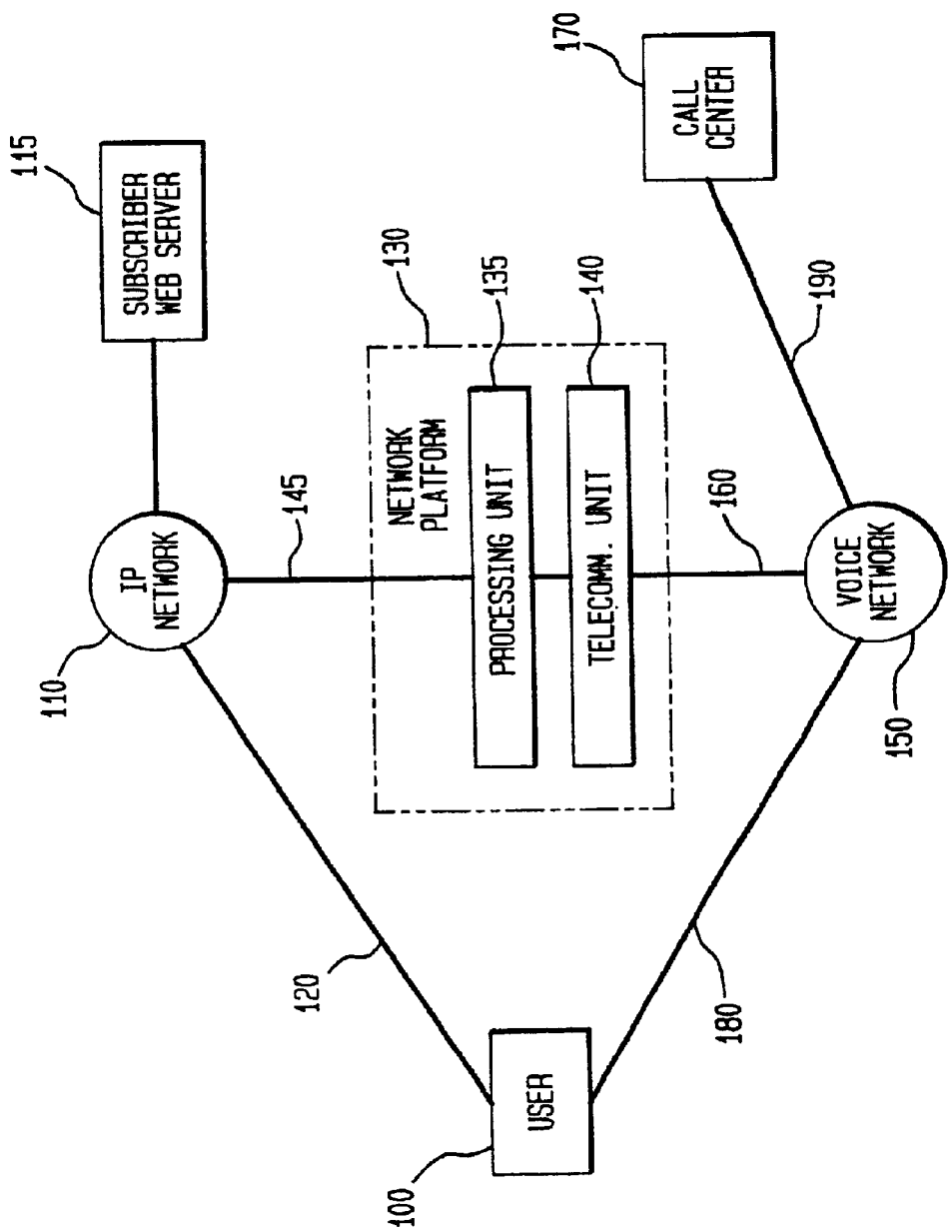
FIG. 1A shows a high-level diagram for an illustrative network-based client-server architecture coordinating activities in the Internet and call center environments in accordance with an embodiment of the present invention.

The basic operation of the present invention is initiated by a customer (also denoted as a user herein) who is engaged in a Web browsing session. The user visits a Web site associated with a subscriber. The subscriber utilizes a call center for sales and marketing activity. A Web page at the site interacts with a network-based service embodied by the present invention that results in a call between the consumer and the call center. The highlights of the invention are now briefly described below in the context of a network-based service platform implementation.

1. Data Passing of Web-Related Information

One or more pages in a subscriber's Web site contain "speak-to-agent" icons. A user browsing the Web site may initiate a call with an agent by clicking on one of the "speak-to-agent" icons. Each such "speak-to-agent" icon is associated, on a one-to-one basis, with data representing one or more characteristics of the Web site—user interaction, such as a subject code, a subscriber identification and, optionally, network "whisper" codes. The Web site may also gather additional charateristics of the Web site—user interaction that may be desired, such as information about the user and what the user seeks; the information could include entries by the user as well as information gleaned from the user's interaction with the Web site. All of this information provides the context of the user's Web interaction and will be referred to in the aggregate as "TAG1."

Each "speak-to-agent" icon also contains a URL that points to a network-based platform. When a user clicks on one of the "speak-to-agent" icons, the user's Web browser will initiate a transmission to the corresponding URL (a server at or associated with the platform site) requesting transmission of an HTML script for displaying a Web page, corresponding to the URL, located at the platform site. Each URL stored with the "speak-to-agent" icons is programmed so that the TAG1 information about the user's interaction with the Web site is passed to the platform by means of URL overloading. URL overloading involves using standard methods for appending the data elements to the URL as a string of parameters. Using URL overloading in this fashion allows the platform to extract the TAG1 data from the overloaded URL using known methods for extracting data from the string of parameters accompanying the URL (as the platform will have access to the parameters appended to the platform-addressed URL).

2. Web Context to Call Center Selection/Routing

The TAG1 data identifies the context of the user's interaction with the Web site during the user 's Web session. Based upon the subscriber identity element and optionally, other TAG1 information, the platform will use the TAG1 data from the Web interaction to select an appropriate existing call center. The platform will then transform or convert the TAG1 data to a form useful for generating a call to the selected call center along with transmission of information about the user's Web interaction that can be used by the call center. The converted data and associated Web interaction information transmitted to the call center along with the call will be referred to in the aggregate as "TAG2." In one example of the conversion from TAG1 to TAG2 data, the platform accesses a database containing a network abstraction table that includes TAG1 subscriber identity and subject code elements, along with corresponding DNIS call center communications numbers. Using the subject code and subscriber ID TAG1 elements, the platform can then obtain from the network abstraction table DNIS routing data for connecting a call to an appropriate call center using DNIS codes; use of DNIS codes takes advantage of standard DNIS-based call-routing capabilities of call centers, thus allowing the call center to further route the call using the extracted and converted Web interaction information. In addition to standard DNIS codes, other examples of TAG2 information include ANI (providing the user's telephone number), user-to-user information (UUI), network-to-user information (NUI), touch-tones—via dual tone multiple frequency (DTMF) reception, whispering, and IP messaging.

Thus, for example, the platform can take the subscriber identity and subject code elements of TAG1 and, using a database, map these elements into a toll free telephone number representing the number for the call center and TAG2 information consisting of a unique DNIS code representative of the subject matter. The platform can then originate a call to the call center using the toll free number, with the DNIS code set according to the DNIS database. The call center can then route the call to the appropriate agent according to the DNIS code. In this way, use of TAG2 information such as a DNIS code provides a basic method of passing information corresponding to the subject matter of the Web site interaction along to the call center.

3. Web Context to Agent Data Passing

TAG2 information can also provide a means to pass Web interaction information along to a call center agent. For example, the optional whisper code of TAG1 identifies data from the session on the Web site to be passed to the call center agent. Thus, once the call center has routed the call to an agent and the agent answers the call, the network platform can "whisper" to the agent informing the agent of the Web context of the call and allowing the agent to associate data collected on the Web with the call. One way in which this may be accomplished is to transform the TAG1 whisper code into an audio message (e.g., a prerecorded message) which is then played over the call connection to the agent. Besides prerecorded messages, other audio messages that may be "whispered" to the agent include, for example, Web site page identifiers, or other information determined by the whisper code of TAG1. Optionally, the authority of the call center and/or the agent to receive information concerning the Web session interaction (which could include user information) could be verified before any information is delivered to the call center or to the agent.

4. Bonding of Voice Call and Web Data Sessions

The network-based platform coordinates and controls the "speak-to-agent" call flows. The platform captures the subject code, optional "whisper" code, and subscriber ID that are passed by the Web site through URL overloading (as described above) for use in the call flow of connecting a user with a call center agent. The platform also contains Web "welcome" pages for user entry of a callback number for the user and, optionally, other user information.

While calls to the call center and user are being set up, the platform can access a database to obtain URLs for displaying pages to the user. These pages can be informational or for advertising purposes.

Once calls are established with the user and with the call center, the platform bridges the calls, enabling user and call center agent to speak. Through the platform, the agent can also pass information along to the user while they are speaking.

5. Agent to Web Data Passing

The agent can send information to the user while the agent and the user are speaking. An example of transmitting information from agent to user involves a "page-push" operation, where the call center agent presents information in the form of a Web page to the user's Web browser. The user's browser would then display the Web page to the user.

The platform can enable the "page-push" function by storing Web pages in a database and sending one or more Web pages selected from the database to the user's browser. The page-push function can be executed in response to a request from the call center agent. Such a request can be transmitted from agent to call center using, e.g., touch-tone or IP messaging from the call center to the platform.

The "page push" function may be accomplished using touch-tone messaging in the following way. The agent selects one or more "pages" of information to send and presses touch tones on his/her telephone. The touch tones, corresponding to unique predefined Web pages for the particular subscriber, are received by the platform. The platform then causes the corresponding Web pages to be transmitted to the user via the user's Web session.

Note that the association between user and call center is applicable to any one of a number of potential voice communication channels, such as Plain Old Telephone Service (POTS)-to-POTS connections, Internet phone to -POTS connections, Internet phone to Internet phone connections, and other media permutations. All of these could include wired or wireless connections.

Architecture

A high level block diagram for an architecture implementing the present invention is shown in FIG. 1A. With reference to FIG. 1, the system is based upon a client-server architecture. The client (also denoted as "user" herein) 100 communicates with Internet 110 through communications link 120, which may include one or more of a number of known channels, e.g., a private connection, the public switched telephone network, a local area network (LAN) connection, a Serial Line Internet Protocol (SLIP) or Point-to-Point Protocol (PPP) connection over a modem or over an ISDN port. The communications between user 100 and Internet 110 may be made through an Internet service provider. The communications link 120 preferably includes an IP-compatible interface. Thus, user 100 may be linked through communications link 120 to Internet 110 in an interactive communications session, such as Web browsing.

Information about a company subscribing to the Web—call center integration service of the present invention is stored in a Web site locatable over Internet 110 using a Web browser and standard URL designation. This Web site associated with the subscriber is maintained on Web server 115.

The Web—call center integration network service platform 130 has a processor unit 135 embodying the typical features of a computer system, i.e, a processor, memory, and one or more communication ports, etc. Platform 130 also has a telecommunications unit 140 which performs functions typically found in existing telecommunications equipment, such as, for example, network switching capability for initiating and routing calls on a telecommunications network (e.g., the PSTN), and interactive voice response capability which includes, e.g., handling of text-to-speech transformation and DTMF recognition (used for detecting keys pressed on a touch-tone keypad).

Network service platform 130 communicates with Internet 110 over communications link 145, which may include one or more of the known channels, e.g., a private connection, the public switched telephone network, a local area network (LAN) connection, a Serial Line Internet Protocol (SLIP) or Point-to-Point Protocol (PPP) connection over a modem or over an ISDN port. Communications link 145, like link 120, preferably includes an IP-compatible interface.

Network service platform 130 is also connected to voice communications network 150 over telecommunications link 160. Link 160 would typically include a network telecommunications interface, such as T1 line. Voice telecommunications network 150 would typically include a long distance telephone carrier network on the PSTN and is used to establish a telephone connection between the user 100 and a call center 170 which is associated with the subscriber. Voice network 150 is connected to user 100 via telecommunications link 180, and to call center 170 via telecommunications link 190. Telecommunications links 180 and 190 would each typically include a telecommunications network, such as a private telephone network or the PSTN.

Figure 1B:
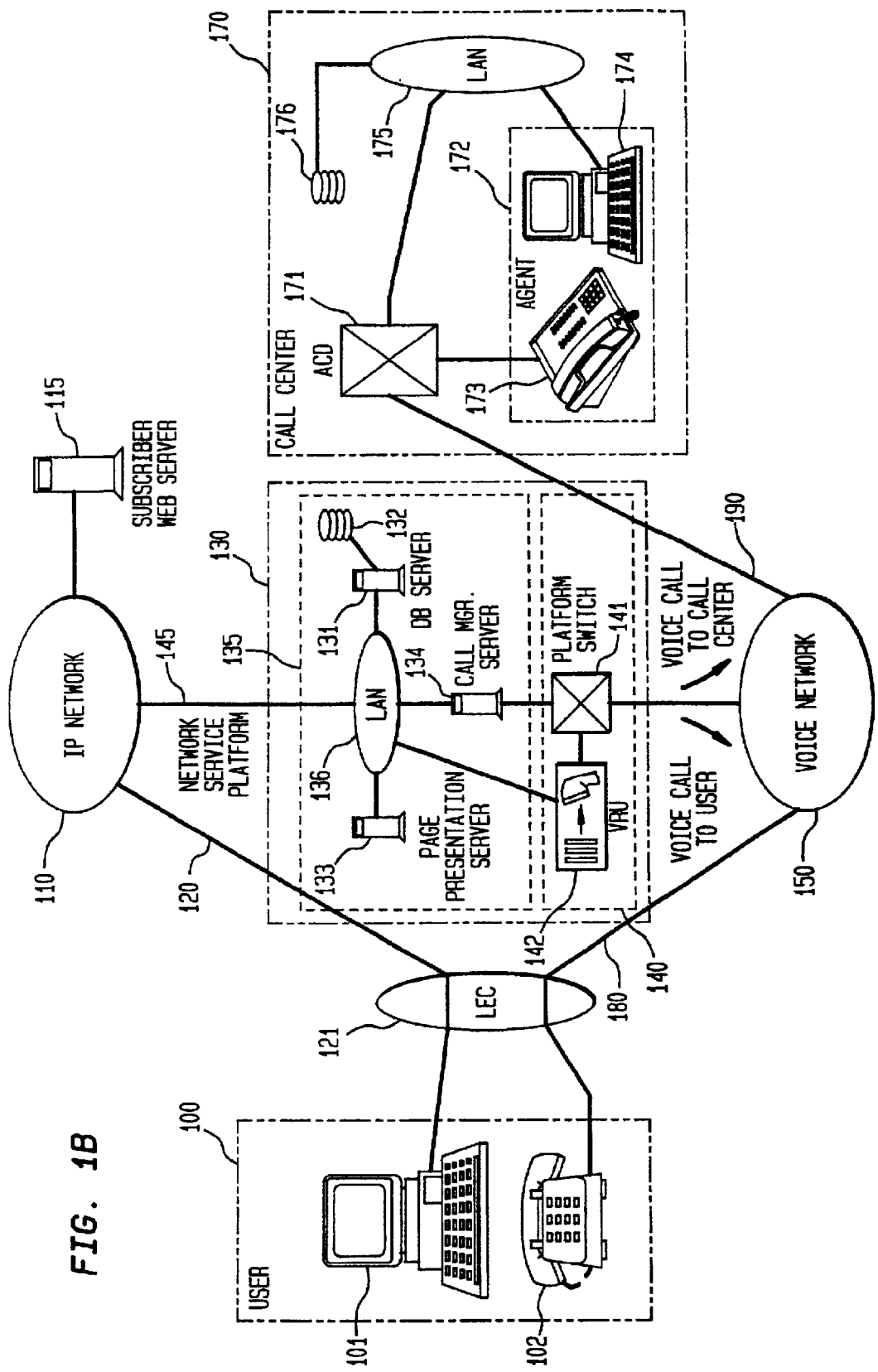
FIG. 1B shows a detailed diagram for an illustrative network-based client-server architecture coordinating activities in the Internet and call center environments in accordance with an embodiment of the present invention.

FIG. 1B provides a more detailed depiction of the architecture, shown in FIG. 1A, for one embodiment of the present invention. User 100 has communications apparatus typically comprising a computer-based workstation 101, such as a personal computer, for interacting with the Internet and a voice communications device 102 (e.g., a telephone) for interacting with a voice communications network, such as the PSTN. A user at workstation 101 may interact with Internet 110 through communications link 120, which may include the public switched telephone network routed through a local exchange carrier (LEC) 121.

As shown in FIG. 1B, the processing unit 135 contained within platform 130 may comprise one or more servers, such as: database server 131, which controls database 132; page presentation server 133 for storing and coordinating the presentation of Web pages to user 100; and call manager server 134 for coordinating and controlling the operations of network services platform 130. Servers 131, 133 and 134 are connected to each other over local area network (LAN) 136. LAN 136 connects to Internet 110 through an IP-compatible connection 145, such as PPP or SLIP, etc. Database 132, which could be a single database or a set of multiple databases, contains data for selecting a call center and determining "TAG2" Web interaction information to accompany the call.

Telecommunications unit 140 of platform 130 comprises a telecommunications switching device 141, which is compatible with the PSTN, and a voice response unit (VRU) 142, which may also be connected to LAN 136. Switch 141 handles the function of establishing calls to call center 170 and to user 100 over voice network 150. Typically, a call may be established by instructing telecommunications switch 141 to place a call to a communications number, which communications number could, e.g., correspond to a DNIS code.

VRU 142 performs the task of test-to-speech conversion which enables the whispering function. VRU 142 may also perform other functions typically performed by telecommunications equipment, such as playback of prerecorded messages (which may be intermixed with the whisper-coded speech and played to the call center agent) and interception and conversion of DTMF signals sent by the call center agent to the platform. Switch 141 may be one of a number of switching devices known in the telecommunications industry; switch 141 may also be part of one of a number of known telecommunications platforms that includes the functions of VRU 142.

Processing unit 135 and VRU 142 are connected through switch 141 and link 160 to voice communications network 150. Voice communications network 150 typically includes a long distance telecommunications network on the PSTN and is used to establish a voice connection between the user 100 and the subscriber's call center 170.

Those skilled in the art will recognize that the functions performed by servers 131, 133 and 134 of the present invention described above could also effectively be performed using a single processor unit or, equivalently, in any number of combinations of processor unit(s) and/or server(s).

The subscriber's call center 170 typically contains an automatic call distribution (ACD) element 171 for connecting a call to agent 172 through a telephone 173. Agent 172 may also have access to a workstation 174 (such as a PC). ACD 171 and workstation 174 are typically connected through LAN 175 to a database 176 containing company information concerning the subscriber and its products or services.

Once it is determined by network service platform 130 that user 100 should be connected by voice to call center 170, platform 130 causes a voice call to be made from network 150 to user 100 (which may be routed through LEC 121) and from network 150 to call center 170; these calls are bridged together establishing a voice call between user 100 and call center 170. It will be clear to those skilled in the art that there are many configurations for routing a call from platform 130 to call center 170 over voice network 150, which configurations could include, for example, routing the call through a local exchange carrier, or through a packet network. Similarly, there are many configurations for routing a call from platform 130 to user 100 over voice network 150. Any of these routing configurations may be utilized in placing calls to the call center and to the user in accordance with the present invention.

Those skilled in the art will recognize that the present invention is equally applicable to the Internet and to other packet networks, such as corporate intranets, which are typically private IP-compatible networks having functionality similar to that of the Internet.

With reference to the architecture described above and depicted in FIG. 1A and with respect to the embodiment shown in FIG. 1B, further details of the present invention will now be set forth.

Typical Call Flow

Figure 2A:
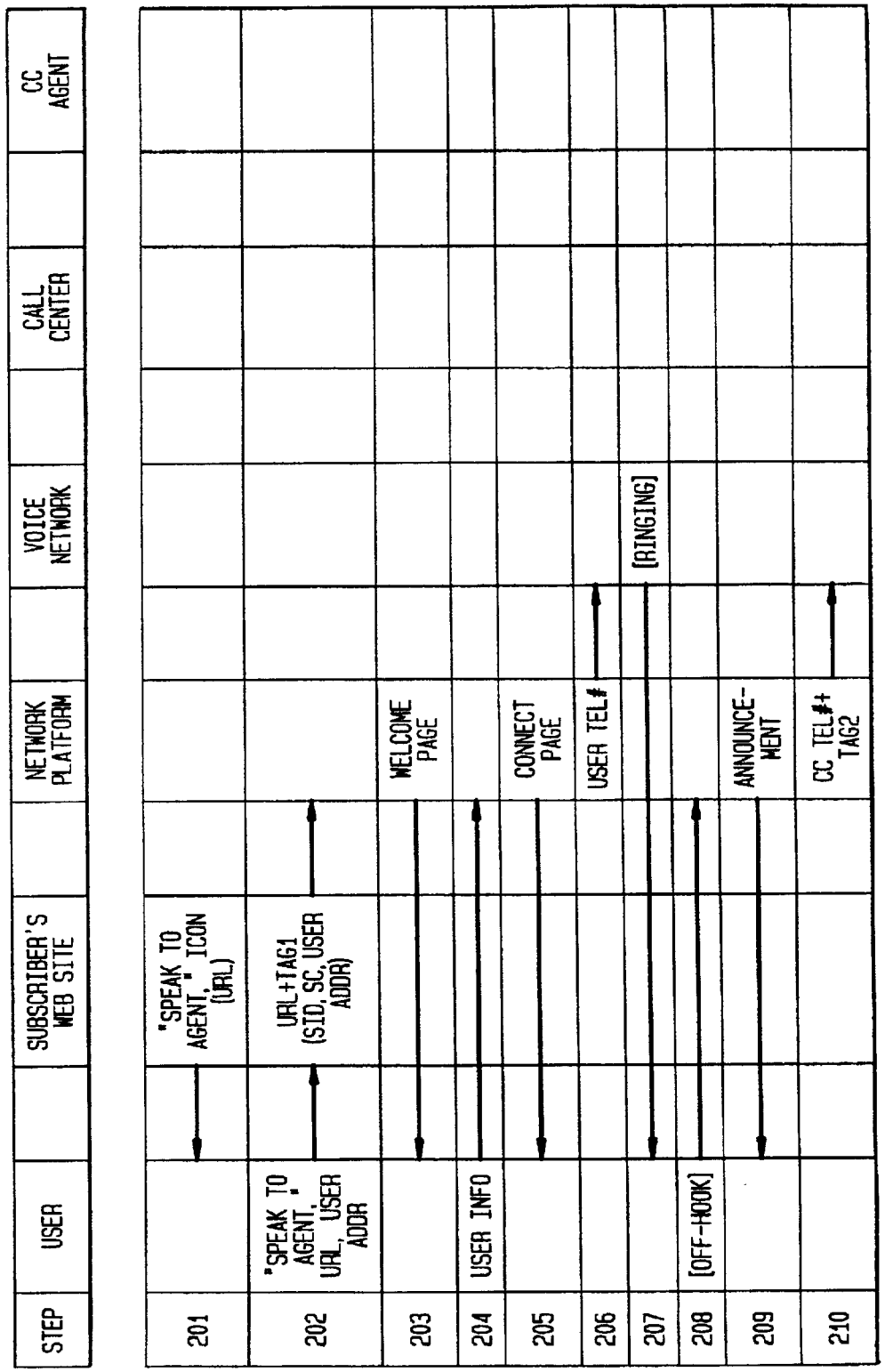
FIG. 2 depicts the message flows between the various participating components in accordance with an embodiment of the present invention.
Figure 2B:
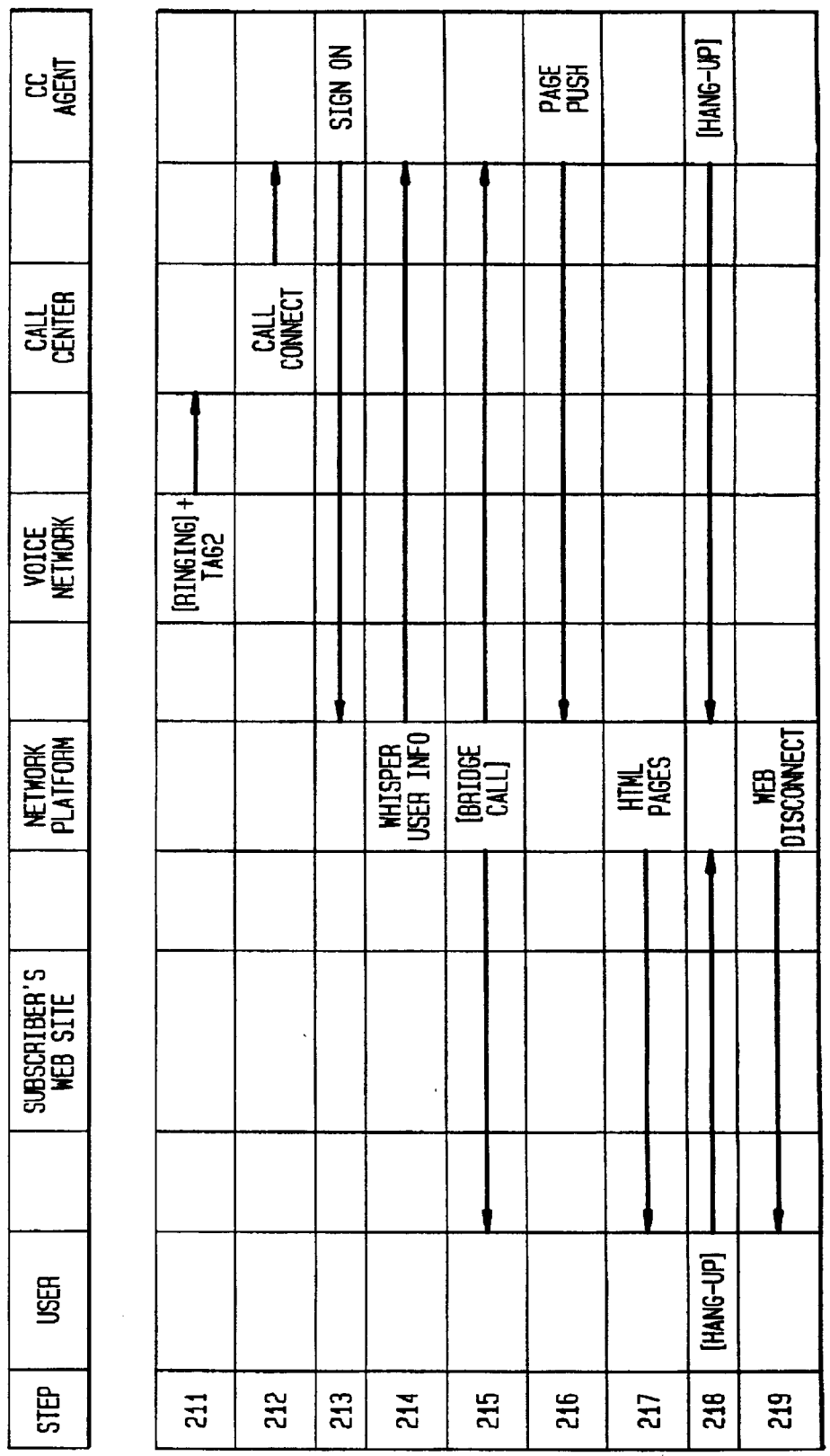

A typical session and the message flows between various components, in the context of a network-based platform implementation of the present invention, are described below with reference to FIG. 2. References to the architecture are included using the same numbered components as referred to in FIG. 1B. FIG. 2 depicts the message flows between user 100, Web server 115 maintaining the subscriber's Web site, the network platform 130, voice network 150 (such as a telephone network interconnected by 4ESS® toll switches), call center 170 and call center agent 172. A default scenario is assumed in which the user is called prior to the launching of a call to the call center. The timing of the call placements is expected to be configurable by the subscriber and defined in policy entries in the subscriber database.

The fundamental operation of the present invention is initiated by a user who is engaged in a Web browsing session. A Web site associated with a subscriber contains a "speak to agent" icon on a Web page at the site. At step 201, a Web session is underway with a user browsing Internet 110. The user locates the subscriber Web site and views a subscriber's page at its Web site. The subscriber's Web site is maintained on Web server 115 which can be operated by the subscriber or by a third party. On this Web page is a "Speak to Agent" icon with an associated overloaded URL. The overloaded URL specifies the network platform and "TAG1" information: a network platform "welcome" page, the subscriber's indentifier (SID), and a subject code (SC) related to the Web page being viewed. In addition, the subscriber application may embed an optional "whisper code" character string in the URL which contains information specific to the user records at the subscriber's call center 170 or other information used by call center 170. If the subscriber application captures the user telephone number it may also be passed to the network platform in the overloaded URL. There may be several icons on a given Web page corresponding to different subject codes.

Step 202: The user clicks on a "Speak to Agent" icon and the user's browser contacts the network platform 130 via the URL which points to platform 130. Through URL overloading, the network platform URL identifies the TAG1 SID and SC elements associated with the Web page that the user was browsing. Network platform 130 also captures an IP address of the user (or the user's proxy).

Step 203: Network platform 130 may check subscriber information contained in database 132 to see whether certain preconditions for establishing a connection to a call center 170 are present (e.g., is the call center accepting network calls from the region the user is calling from at that time or day). If the call is allowed, network platform 130 sends a "Welcome to Network Services" greeting page (or something similar) over Internet 110 via connection 145.

The user's telephone number for receiving the call may be ascertained in any number of known ways, e.g., prompting the user for the telephone number or for information (such as a network user ID, a password, or a customer code assigned to the user by the call center) from which platform 130 may determine the user's telephone number. Optionally, the greeting page may present information to the user and ask for confirmation.

Step 204: User 100 enters or confirms the requested information (which may include a telephone number) on the Web page and submits it over Internet 110 to network platform 130.

Step 205: The network platform 130 sends a "Connect Page" back to the user over Internet 110 indicating that the call center has been contacted and that user should expect a voice call in the future. The Connect Page may contain additional information or promotional content provided by the subscriber. Network platform 130 translates the TAG1 SID and subject code elements into a telephone number for a call center specified by the subscriber and associated TAG2 data by, e.g., looking up data from database 132 (which may be indexed according to the subject-code and to the subscriber ID). In the case where the telephone number for the call center is a toll free telephone number, the TAG2 information may include a unique DNIS code (representative of the subject matter) corresponding to DNIS codes expected at the call center associated with the subscriber, and the call to be set up and originated to call center 170 will use the toll free number with the DNIS code set according to database 132.

Step 206: Network platform 130 initiates the calling process via platform switch 141 for placing calls on the PSTN 150 to the user 100 and to the call center 170. A default timing of the call placements could be to first call the user or, alternatively, the call center; the order and timing of the call placements may be specified in database 132. The calls may be placed simultaneously or after one or another of the legs of the call has gone off hook. If user 100 is called before call center 170, network platform 130 will play an announcement to the user indicating that the call center is being contacted. The remainder of this call flow description will assume that call center 170 is called only after a connection is first established with the telephone line of user 100.

Step 207: Switch 141 of network platform 130 initiates a call over voice telephone network 150 to user 100, which rings the user's telephone 102.

Step 208: The user answers, which generates an offhook signal on PSTN 150 ultimately received by network platform 130 via switch 141.

Step 209: Network platform 130 plays an announcement through switch 141 and PSTN 150 to user 100.

Step 210: Switch 141 of network platform 130 initiates a call to call center 170 over voice telephone network 150 with TAG2 Web interaction data accompanying the call. The TAG2 information accompanying the call may, in the case where the call center telephone number is toll-free, include DNIS codes.

Step 211: Voice telephone network 150 routes the call to ACD 171 at the call center 170 site, including accompanying TAG2 data.

Step 212: Call center ACD 171 connects the incoming call to call center agent 172.

Step 213: Agent 172 "signs on" to network platform 130 by, e.g., sending a unique DTMF tone sequence (such as # or *) over PSTN 150 through ACD 171. If a DTMF tone sequence is used, the sequence would be intercepted at platform 130 by VRU 142.

Step 214: Network platform 130 "whispers" user information to agent 172 via text-to-speech transformation using VRU 142, which sends the whispered speech to agent 172 over voice network 150 through ACD 171. The whispered information may correspond to a customer code assigned by call center 170 to user 100.

Step 215: Network platform 130 bridges the two legs of the voice connection together, so that user 100 and the call center agent 172 may begin a voice conversation.

Step 216: Agent 172 may suggest that the user 100 receive additional information over Internet 110 via the user Web link 120. If the user agrees, agent 172 selects pages to "push" to the user; this is accomplished by, e.g., entering a sequence of one or more DTMF digits which is captured by VRU 142 in network platform 130 and translated by platform 130 into one or more HTML pages stored in Page Presentation Server 133 of platform 130.

Step 217: Page Presentation Server 133 causes the HTML page(s) selected by agent 172 to be sent to user 100 through connection 145, Internet 110 and Web link 120. The browser on the user's PC 101 causes the Web page to be displayed. (Steps 216 and 217 may be repeated during the course of the session.)

Step 218: The user and call center agent may complete any business to be transacted. By mutual consent, user 100 and agent 172 terminate the voice connection and disconnect signals are sent through PSTN 150 to network platform 130. The voice connection is then terminated.

Step 219: Network platform 130 sends a final "Web Disconnect" page to user 100 terminating the Web interaction between the subscriber and the user.

Those skilled in the art will recognize that the foregoing discussion represents only one possible embodiment of the present invention, and that other embodiments are possible. In particular, the use of DNIS codes and "whispering" of user information to the call center agent are but two alternatives for passing information about the user's Web session to the call center, and that other known methods exist in the telecommunications industry for transferring such information to the call center. Such methods may include, e.g., use of ANI (providing the user's telephone number), user-to-user information (UUI), network-to-user information (NUI), touch-tones (via DTMF reception), and IP messaging. Those skilled in the art will further recognize that some of the above-described messaging and signaling, such as a greeting page, a connect page, and announcements played to the user are optional and, where present, may be varied in their content and order of presentation without affecting the nature of the present invention.

The present invention may be implemented using hardware and software components known in the industry for implementing the required functionality as described above. Alternatively, the present invention could be implemented on a computer-based telephone network platform, such as the Lucent CONVERSANT ® platform, which is well-known in the telecommunications industry.

In summary, a system and method for coordinating information at the network-based level between existing call centers and the Internet has been described which creates improved integration of and bonding between a customer's interaction with a Web site and with a call center.

What has been described is merely illustrative of the application of the principles of the present invention. Other arrangements and methods can be implemented by those skilled in the art without departing from the spirit and scope of the present invention.

What is claimed is:

1. A method of correlating information between a call center associated with a subscriber and a packet network linked in an on-going interactive communication session with a user, the correlation occurring at a network service platform coupled to both the packet network and a telecommunications network, the method comprising:

receiving information at the network service platform from the packet network, the received information corresponding to at least one characteristic of the on-going interactive communication session;

transmitting the received information from the network service platform to the call center over the telecommunication network;

based on the at least one characteristic, establishing a telecommunications session between the user and the call center over the telecommunication network;

maintaining a continued association between the user and the packet network through the on-going interactive communication session during the established telecommunications session, including passing information between the on-going interactive communication session and the established telecommunications session through the network service platform;

receiving a page push signal at the network service platform, the page push signal corresponding to at least one of a plurality of web pages; and pushing the at least one of the plurality of web pages corresponding to the page push signal to the user during the interactive communication session.

2. The method according to claim 1, wherein establishing the telecommunications session between the user and the call center comprises establishing a first call from the network service platform to the call center;

establishing a second call from the network service platform to the user; and bridging the first call with the second call through the network service platform so that the telecommunications session between the user and the call center over the voice network can be established.

3. The method according to claim 1, wherein the at least one characteristic of the interactive communication session includes at least one of an identity of the subscriber and a subject matter associated with the on-going interactive communication session.

4. The method according to claim 1, wherein receiving information over the packet network includes receiving information transmitted over the packet network using a uniform resource locator (URL).

5. The method according to claim 1, wherein transmitting the received information corresponding to at least one characteristic of the on-going interactive communication session, comprises:

transforming, at the network service platform, the received information into a form suitable for placing a call over the telecommunications network to the call center, the call being routable by the call center in accordance with the received information.

6. The method according to claim 5 wherein transforming the information into a form suitable for placing a call over the telecommunications network comprises using a database containing at least one entry from information corresponding to at least one characteristics of the on-going interactive communication session and at least one entry corresponding to a communications number for the call center.

7. The method according to claim 6 wherein the at least one entry corresponding to a communications number for the call center includes a dialed number identification service (DNIS) code.

8. The method according to claim 6 wherein the at least one characteristics of the on-going interactive communication session includes at least one of an identity of the subscriber and a subject matter associated with the on-going interactive communication session.

9. The method according to claim 5 wherein transforming the received information into a form suitable for placing a call over a telecommunications network to the call center comprises:

transforming the received information into a dialed number identification service (DNIS) code.

10. The method according to claim 1, wherein transmitting the received information corresponding to at least one characteristic of the on-going interactive communication session comprises:

sending audio signals representing the received information from the network service platform to the call center.

11. The method according to claim 10 wherein sending audio signals representing the received information to the call center comprises:

transforming, at the network service platform, the information into audible sounds; and playing the audible sounds over a telecommunications connection established between the call center and the network service platform.

12. A method of correlating information between a call center associated with a subscriber and a packet network linked in an interactive session with a user, comprising:

receiving information at a network service platform from the packet network, the received information corresponding to at least one characteristic of the interactive communication session;

transmitting the received information from the network service platform to the call center over a telecommunications network;

based on the at least one characteristic, establishing a telecommunications session between the user and the call center over the telecommunication network;

maintaining a continued association between the user and the packet network through the on-going interactive communication session during the established telecommunications session, including passing information between the on-going interactive communication session and the established telecommunications session through the network service platform; and pushing at least one web page to the user during the on-going interactive communication session based on an interaction between the network service platform and the call center while the telecommunications session between the user and the call center is being established.

13. The method of claim 12 wherein establishing the telecommunications session between the user and the call center comprises establishing a first call from the network service platform to the call center;

establishing a second call from the network service platform to the user; and bridging the first call with the second call so that the telecommunications session between the user and the call center over the voice network can be established.

14. The method according to claim 12, further comprising:

receiving a page push signal at the network service platform, the page push signal corresponding to at least one of a plurality of web pages; and pushing the at least one of the plurality of web pages corresponding to the page push signal to the user during the on-going interactive communication session.

* * * * *